(12) United States Patent
Dubrovin et al.

(10) Patent No.: US 8,891,351 B2
(45) Date of Patent: Nov. 18, 2014

(54) ORTHOGONAL VARIABLE SPREADING FACTOR CODE SEQUENCE GENERATION

(75) Inventors: Leonid Dubrovin, Karney Shomron (IL); Alexander Rabinovitch, Kfar Yona (IL); Eliahou Arviv, Modiin (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 212 days.

(21) Appl. No.: 13/245,098

(22) Filed: Sep. 26, 2011

(65) Prior Publication Data

US 2013/0077464 A1 Mar. 28, 2013

(51) Int. Cl.
*H04J 11/00* (2006.01)
*H04J 13/00* (2011.01)
*H04J 13/12* (2011.01)

(52) U.S. Cl.
CPC ............. *H04J 13/12* (2013.01); *H04J 13/0044* (2013.01)
USPC ........................................................ 370/208

(58) Field of Classification Search
None
See application file for complete search history.

(56) References Cited

U.S. PATENT DOCUMENTS

| 6,646,579 | B2 | 11/2003 | Doetsch et al. ............... 341/96 |
| 6,907,060 | B2 | 6/2005 | Yang ........................... 375/141 |
| 7,289,426 | B2 | 10/2007 | Pappalardo et al. ......... 370/208 |
| 7,586,835 | B2 | 9/2009 | Lee et al. .................... 370/209 |
| 7,729,235 | B2 | 6/2010 | Yeh ............................. 370/208 |
| 7,894,327 | B2 | 2/2011 | Prokop et al. ............... 370/208 |
| 2002/0171568 | A1* | 11/2002 | Yang ........................... 341/96 |
| 2003/0099282 | A1* | 5/2003 | Magnusson ................. 375/140 |
| 2004/0131009 | A1* | 7/2004 | Pappalardo et al. ......... 370/208 |

OTHER PUBLICATIONS

"3GPP Technical Specification 25.223", V10.0.0, Section 6, pp. 1-2 and 15-22, Dec. 2010.

* cited by examiner

*Primary Examiner* — Chi Pham
*Assistant Examiner* — Kouroush Mohebbi
(74) *Attorney, Agent, or Firm* — Christopher P. Maiorana, PC

(57) ABSTRACT

An apparatus generally having a first circuit and a second circuit is disclosed. The first circuit may be configured to generate (i) a plurality of first code bits in response to an index value and (ii) a plurality of first intermediate bits in response to the index value. The first code bits may be generated in parallel with the first intermediate bits. The second circuit may be configured to generate a plurality of second code bits in response to all of (i) the index value, (ii) the first code bits and (iii) the first intermediate bits. A combination of the first code bits and the second code bits generally forms one of a plurality of orthogonal codes.

20 Claims, 5 Drawing Sheets

ORTHOGONAL VARIABLE SPREADING FACTOR CODE SEQUENCE GENERATION

FIELD OF THE INVENTION

The present invention relates to code division multiple access generally and, more particularly, to a method and/or apparatus for implementing orthogonal variable spreading factor code sequence generation.

BACKGROUND OF THE INVENTION

In the wideband code division multiple access (i.e., WCDMA) standard, orthogonal variable spreading factor (i.e., OVSF) sequences are used to distinguish multiple users. Several common implementations exist to generate an OVSF sequence for a user when a sequence index of the user is known. Some common implementations are sequential and thus generate only a single bit of the sequence per cycle. The single bit per cycle techniques are suitable in cases where slow bit processing rates are acceptable.

In cases utilizing fast processing rates, a whole OVSF sequence (i.e., 256 bits) or even several OVSF sequences should be generated in a single cycle. To achieve the fast processing rate, a timing of the sequence generation should be minimized. The common implementations utilize additional levels of exclusive OR gates (i.e., XOR gates) for each doubling of the OVSF sequence length. A known process to generate a single OVSF sequence having bits $B_0 \ldots B_{(L-1)}$ based on a sequence index having bits $A_0 \ldots A_{(N-1)}$ is described as follows. The number of different OVSF sequences that could be generated depends on a spreading factor (i.e., L). The spreading factor L represents the number of bits in each sequence and is a power of 2 (i.e., $L=2^N$). Usually, the value N belongs to a range $1 \leq N \leq 8$. The first four bits of the sequence are calculated as:

$B_0=1$;

$B_1=\text{NOT}(A_0)$;

$B_2=\text{NOT}(A_1)$; and $B_3=\text{XOR}(A_1, B_1)$, where "1" represents a logical one and NOT is a logical inversion. Calculation of the next 4 bits depends on the previous 4 bits:

$B_4 \ldots B_7=\text{XOR}(B_0 \ldots B_3, A_2)$.

Calculation of the next 8 bits depends on the previous 8 bits:

$B_8 \ldots B_{15}=\text{XOR}(B_0 \ldots B_7, A_3)$.

Calculation of the next 16 bits depends on the previous 16 bits:

$B_{16} \ldots B_{31}=\text{XOR}(B_0 \ldots B_{15}, A_4)$.

The common methods generate a 4-bit length OVSF sequence by implementing a level of XOR gates after a level of NOT gates. Generation of an 8-bit length OVSF sequence is implemented as two levels of XOR gates after the level of NOT gates. Generation of a 256-bit length OVSF sequence is implemented as 7 levels of XOR gates after the level of NOT gates. Each level of XOR gates increases a timing delay of the OVSF sequence generation process, thus decreasing the maximum possible calculation frequency. In modern hardware systems, additional operations are commonly performed after the OVSF sequence is generated in the same clock cycle as the OVSF sequence generation. Therefore, a reduction of every XOR gate level increases the maximum possible calculation frequency.

Some conventional implementations slightly reduce the number of XOR gate levels. However, such implementations increase the number of overall XOR gates. The increased number of gates increases a chip area of the design and increases a power consumption.

It would be desirable to implement orthogonal variable spreading factor code sequence generation.

SUMMARY OF THE INVENTION

The present invention concerns an apparatus generally having a first circuit and a second circuit. The first circuit may be configured to generate (i) a plurality of first code bits in response to an index value and (ii) a plurality of first intermediate bits in response to the index value. The first code bits may be generated in parallel with the first intermediate bits. The second circuit may be configured to generate a plurality of second code bits in response to all of (i) the index value, (ii) the first code bits and (iii) the first intermediate bits. A combination of the first code bits and the second code bits generally forms one of a plurality of orthogonal codes.

The objects, features and advantages of the present invention include providing orthogonal variable spreading factor code sequence generation that may (i) implement fewer XOR gate levels than conventional designs, (ii) calculate an orthogonal code faster than the conventional designs, (iii) use approximately a same number of logic gates as the conventional designs, (iv) form part of a wideband code division multiple access circuit and/or (v) generate an orthogonal variable spreading factor code.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention generally concern a hardware implementation of a wideband code division multiple access (e.g., WCDMA) orthogonal variable spreading factor (e.g., OVSF) code generator. The generator may have a reduced number of logic gate levels compared with existing techniques. The generator may also have a reduced calculation timing compared with existing techniques, with almost no effect on a number of implemented logic gates. In some implementations, the number of the exclusive OR (XOR) gate levels may be reduced by approximately 50 percent compared with existing designs.

Figure 1:
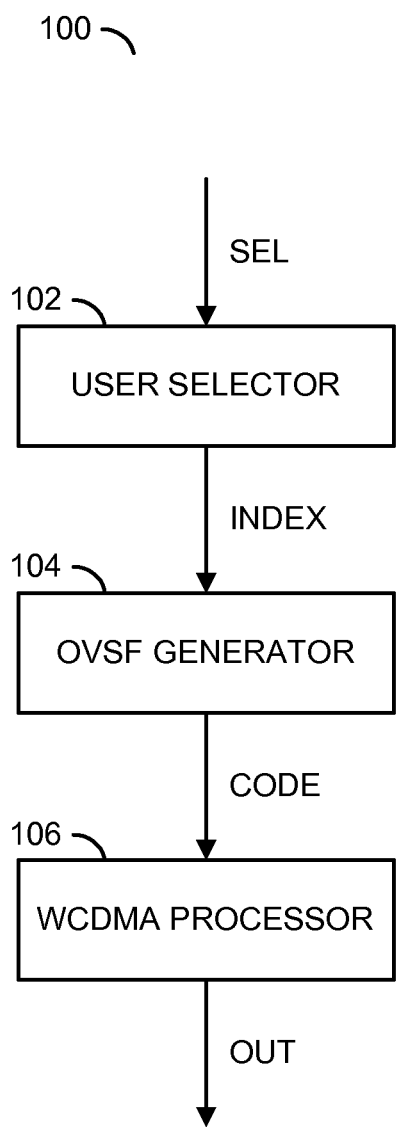
FIG. 1 is a block diagram of an example implementation of a WCDMA circuit.

Referring to FIG. 1, a block diagram of an example implementation of a circuit 100 is shown. The circuit (or apparatus or device or integrated circuit) 100 may form a WCDMA circuit. The circuit 100 generally comprises a block (or circuit) 102, a block (or circuit) 104 and a block (or circuit) 106. The circuits 102-106 may represent modules and/or blocks that may be implemented as hardware, software, a combination of hardware and software, or other implementations. In some embodiments, the circuit 104 may be implemented only in hardware.

A select signal (e.g., SEL) may be received by the circuit 102. An index signal (e.g., INDEX) may be generated by the circuit 102 and presented to the circuit 104. The circuit 104 may generate a code signal (e.g., CODE) transferred to the circuit 106. An output signal (e.g., OUT) may be generated by the circuit 106.

The circuit 102 may implement a user selector circuit. The circuit 102 is generally operational to determine an index value (or index bits) for a selected user based on a selection value received in the signal SEL. A table or list may be programmed and/or designed into the circuit 102 to associate each of several users with a respective index value. Upon receipt of the selection value, the circuit 102 may generate a corresponding index value, which is presented in the signal INDEX to the circuit 104.

The circuit 104 may implement an OVSF generator circuit. The circuit 104 is generally operational to calculate a unique code value (or code bits) among multiple possible code values based on the index value received in the signal INDEX. Generation of a code value may involve generating a plurality of initial code bits in response to the index value. In parallel (or simultaneously) to generating the initial code bits, a plurality of initial intermediate bits may also be generated in response to the index value. The index value, the initial code bits and the initial intermediate bits may be used to generate a plurality of additional code bits. For short codes (e.g., 16 bits), a combination of the initial code bits and the additional code bits generally forms a code word of a plurality of short orthogonal codes.

To achieve a longer code word (e.g., 256 bits), the circuit 104 may perform additional calculations. A plurality of additional intermediate bits may be generated in response to both the index value and the initial intermediate bits. The additional intermediate bits may be generated in parallel (or simultaneously) with the additional code bits. A plurality of subsequent code bits may then be generated in response to all of the index value, the initial code bits, the initial intermediate values and the additional intermediate values. A combination of the initial code bits, the additional code bits and the subsequent code bits generally forms a code word of a plurality of long orthogonal codes. The unique code value may be presented in the signal CODE to the circuit 106. Even longer orthogonal codes may be generated by calculating more intermediate bits and subsequently calculating additional sets of an orthogonal code.

The circuit 106 may implement a WCDMA processor circuit. The circuit 106 may be operational to utilize the orthogonal code received in the signal CODE to process data. The processing may include a spreading modulation based on the orthogonal code. The spreading processing may be performed in compliance with the wideband code division multiple access standard, which is generally described in the 3GPP technical specification 25.223, section 6, "Spreading Modulation", hereby incorporated by reference. The processed data may be presented by the circuit 106 in the signal OUT.

Figure 2:
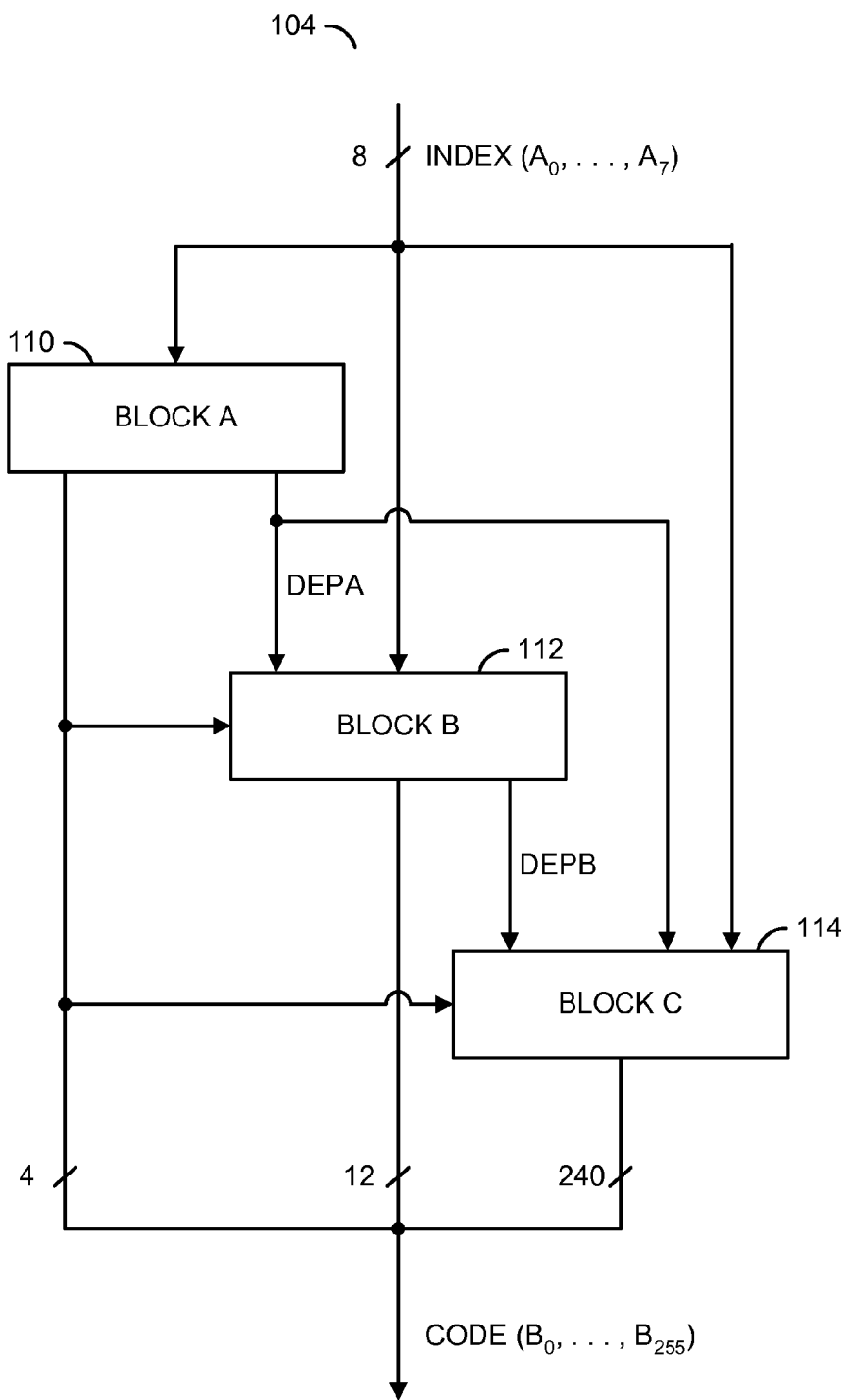
FIG. 2 is a block diagram of an example implementation of an OVSF generator circuit in accordance with a preferred embodiment of the present invention.

Referring to FIG. 2, a block diagram of an example implementation of the circuit 104 is shown in accordance with a preferred embodiment of the present invention. The circuit 104 generally comprises a block (or circuit) 110, a block (or circuit) 112 and a block (or circuit) 114. The circuits 110-114 may represent modules and/or blocks that may be implemented as hardware, software, a combination of hardware and software, or other implementations. In some embodiments, the circuits 110-114 may be implemented only in hardware.

The signal INDEX may be received by the circuits 110, 112 and 114. A signal (e.g., DEPA) may be generated by the circuit 110 and received by the circuits 112 and 114. A signal (e.g., DEPB) may be generated by the circuit 112 and received by the circuit 114. The signal CODE may be generated as a combined aggregation by the circuits 110, 112 and 114.

The circuit 110 may implement a logic block. The circuit 110 is generally operational to generate an initial portion of the code bits (e.g., 4 bits) in response to an index value received in the signal INDEX. The initial code bits may be presented as part of the signal CODE. The circuit 110 may also generate a plurality of initial intermediate (or dependent) bits in response to the index value. The initial intermediate bits may be presented in the signal DEPA to the circuits 112 and 114. The initial code bits may be generated in parallel (or simultaneously) with the initial intermediate bits by the circuit 110. A maximum gate delay through the circuit 110 from reception of an index value in the signal INDEX until the initial code bits are available in the signal CODE may be two gate delays. A single gate delay may be experienced through the circuit 110 from the reception of the index value in the signal INDEX until the initial intermediate values are presented in the signal DEPA.

The circuit 112 may implement another logic block. The circuit 112 is generally operational to generate additional code bits (e.g., 12 bits) in response to all of the index value as received in the signal INDEX, the initial code bits generated by the circuit 110 and the initial intermediate bits received in the signal DEPA. The additional code bits may be presented as part of the signal CODE. The circuit 112 may also generate the additional intermediate (or dependent) bits in response to both the index value received in the signal INDEX and the initial intermediate bits received in the signal DEPA. The additional intermediate bits may be presented in the signal DEPB to the circuit 114. The additional intermediate bits may be generated in parallel (or simultaneously) with the additional code bits generated by the circuit 112. A combination of the initial code bits generated by the circuit 110 and the additional code bits generated by the circuit 112 generally forms a short code (e.g., 16-bit code) of several possible orthogonal codes. A single gate delay may be experienced through the circuit 112 from the reception of the additional intermediate bits in the signal DEPA until (i) the additional code bits are available in the signal CODE and (ii) the additional intermediate values are presented in the signal DEPB.

The circuit 114 may implement another logic block. The circuit 114 is generally operational to generate the subsequent code bits (e.g., 240 bits) in response to all of the index value received in the signal INDEX, the initial code bits received from the circuit 110, the initial intermediate values received in the signal DEPA and the additional intermediate values received in the signal DEPB. The additional code bits may be presented as part of the signal CODE. A combination of the initial code bits, the additional code bits and the subsequent code bits generally forms an orthogonal code (e.g., a 256-bit code) uniquely based on the index value. A single gate delay may be experienced through the circuit 114 from the reception of the additional intermediate bits in the signal DEPB until the subsequent code bits are available in the signal CODE.

Where the circuits 110, 112 and 114 are implemented only as hardware, a maximum propagation delay from the reception of the signal INDEX until the signal CODE is completely calculated may be a maximum of four gate delays. Two of the gate delays may be experienced through the circuit 110. An additional gate delay may be experienced through the circuit 112. Since the index value in the signal INDEX is received by the circuit 112 before the initial intermediate value in the signal DEPA, the total gate delays from the reception of the signal INDEX until the additional code bits are available in the signal CODE and the additional intermediate bits are available in the signal DEPB may be three gate delays. An additional gate delay may be experienced through the circuit 114. Since the index value in the signal INDEX is received by the circuit 114 before the intermediate value in the signal DEPB is ready, the total gate delay from the reception of the index value in the signal INDEX until the code bits (or code value) is available in the signal CODE may be a maximum of four gate delays.

The common OVSF generation techniques double the number of generated code bits by XORing the previously generated bits with the next bit of the sequence index. Starting from the second doubling, the generated bits depend on the XORed bits of the sequence index. However, the circuits 110 and 112 (and in some designs, the circuit 114) may perform XORing of corresponding bits of the sequence index in parallel (or simultaneously) with the generation of the code bits. Furthermore, an optimal balance may be achieved by the circuits 110-114 between generating bits in a known way and generating parallel dependency (or intermediate) bits to reduce the number of XOR gates levels to a possible minimum with a possible slight increase in the total number of XOR gates (e.g., 12 additional gates for code sequence of 256 bits).

Figure 3:
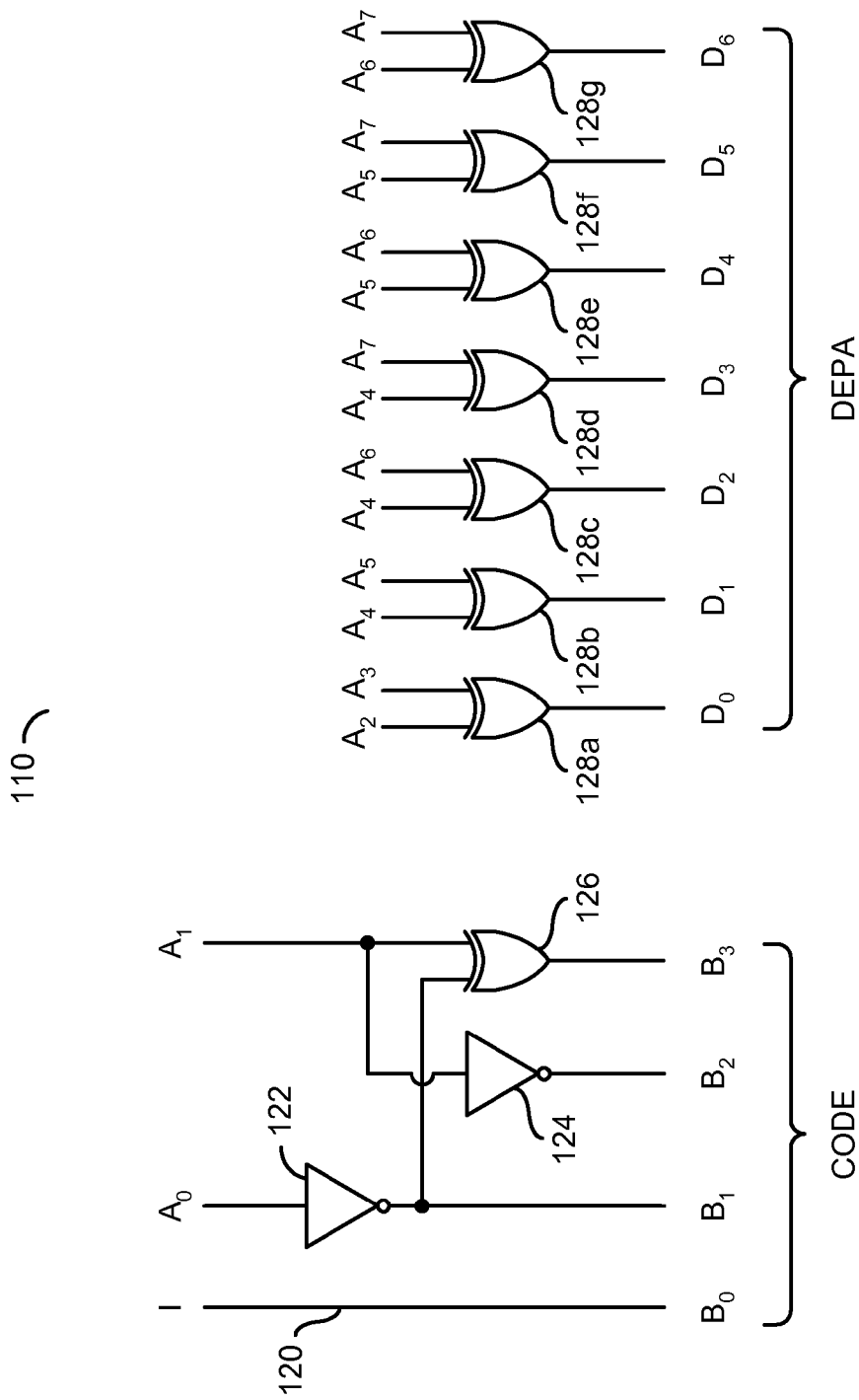
FIG. 3 is a block diagram of an example implementation of a logic circuit within the OVSF generator circuit.

Referring to FIG. 3, a block diagram of an example implementation of the circuit 110 is shown. The circuit 110 generally comprises a wire (or circuit) 120, an inverter (or circuit) 122, an inverter (or circuit) 124, a gate (or circuit) 126 and multiple gates (or circuits) 128a-128g. The circuits 120-128g may represent modules and/or blocks that may be implemented as hardware, software, a combination of hardware and software, or other implementations. In some embodiments, the circuits 120-128g may be implemented only in hardware. Each circuit 126 and 128a-128g may implement a two-input XOR gate.

A logical "1" (one) value may be presented on the wire 120 as the code bit $B_0$. A bit (e.g., $A_0$) of the index value may be received by the circuits 122. Another bit (e.g., $A_1$) of the index value may be received by the circuits 124 and 126. The circuit 122 may generate a code bit (e.g., $B_1$) of the signal CODE by inverting the bit $A_0$. The circuit 124 may generate another code bit (e.g., $B_2$) of the signal CODE by inverting the bit $A_1$. The circuit 126 may generate yet another code bit (e.g., $B_3$) of the signal CODE by exclusively ORing the bits $B_1$ and $A_1$. Each circuit 128a-128g may receive two of the bits of the index value, a different value at each of two gate inputs of each circuit 128a-128g. Each circuit 128a-128g may generate a respective one of the initial intermediate bits (e.g., $D_0$-$D_6$) in the signal DEPA. The calculations performed by the circuits 120-126 may be expressed as follows:

$B_0 = 1$;

$B_1 = \text{NOT}(A_0)$;

$B_2 = \text{NOT}(A_1)$; and $B_3 = \text{XOR}(A_1, \text{NOT}(A_0))$.

In parallel to the circuits 120-126, the following intermediate (or dependency) bits may be calculated by the circuits 128a-128g:

$D_0 = \text{XOR}(A_2, A_3)$;

$D_1 = \text{XOR}(A_4, A_5)$;

$D_2 = \text{XOR}(A_4, A_6)$;

$D_3 = \text{XOR}(A_4, A_7)$;

$D_4 = \text{XOR}(A_5, A_6)$;

$D_5 = \text{XOR}(A_5, A_7)$; and $D_6 = \text{XOR}(A_6, A_7)$.

Figure 4:
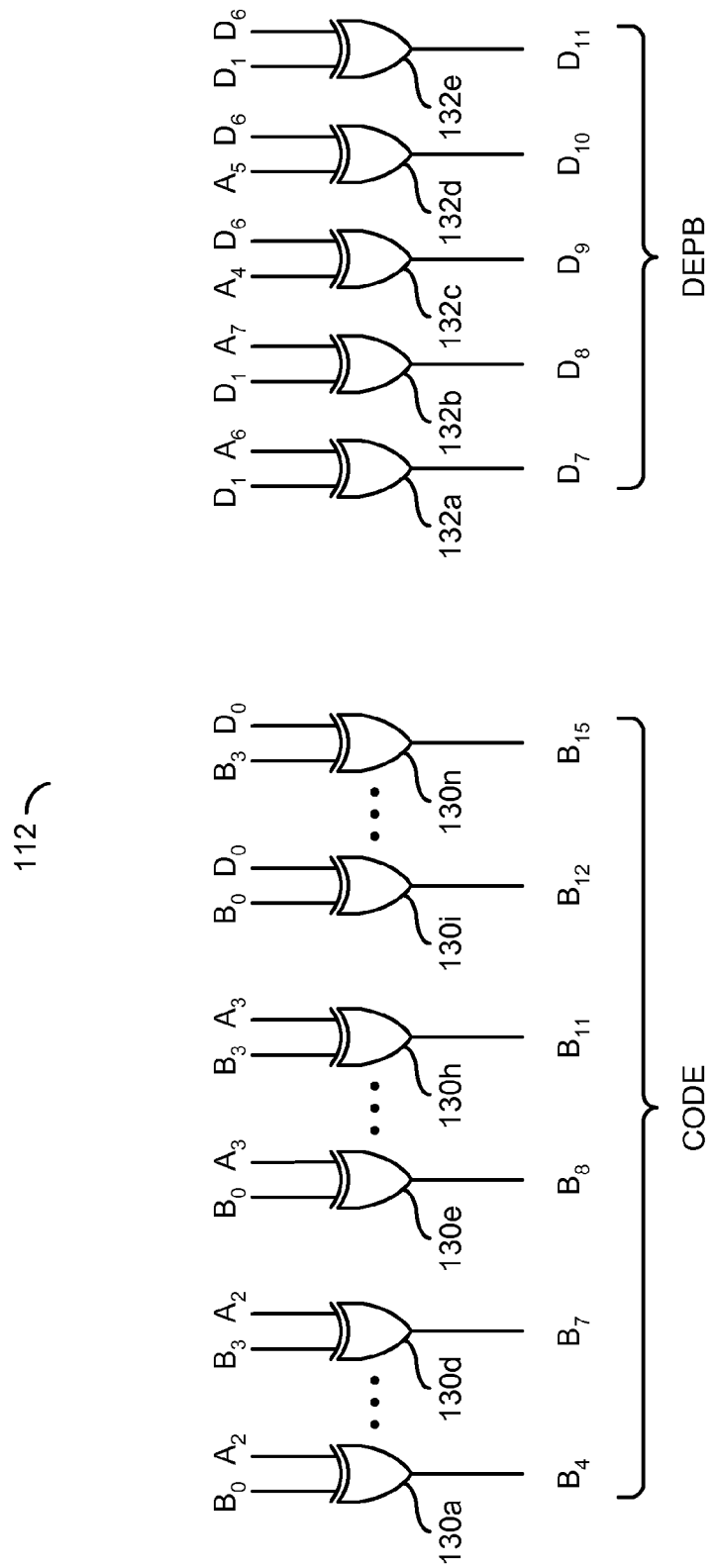
FIG. 4 is a block diagram of an example implementation of another logic circuit within the OVSF generator circuit.

Referring to FIG. 4, a block diagram of an example implementation of the circuit 112 is shown. The circuit 112 generally comprises multiple gates (or circuits) 130a-130n and multiple gates (or circuits) 132a-132e. The circuits 130a-132e may represent modules and/or blocks that may be implemented as hardware, software, a combination of hardware and software, or other implementations. In some embodiments, the circuits 130a-132e may be implemented only in hardware. Each circuit 130a-132e may implement a two-input XOR gate.

The circuits 130a-130n may generate a respective one of the additional code bits (e.g., $B_4$-$B_{15}$) in the signal CODE. The circuits 132a-132e may generate a respective one of the additional intermediate bits (e.g., $D_7$-$D_{11}$) in the signal DEPB. The calculations performed by the circuits 130a-130n may be expressed as follows:

$B_4 \ldots B_7 = \text{XOR}(B_0 \ldots B_3, A_2)$;

$B_8 \ldots B_{11} = \text{XOR}(B_0 \ldots B_3, A_3)$; and $B_{12} \ldots B_{15} = \text{XOR}(B_0 \ldots B_3, D_0)$.

In parallel to the circuits 130a-130n, the following intermediate (or dependency) bits may be calculated by the circuits 132a-132e:

$D_7 = \text{XOR}(D_1, A_6)$;

$D_8 = \text{XOR}(D_1, A_7)$;

$D_9 = \text{XOR}(A_4, D_6)$;

$D_{10} = \text{XOR}(A_5, D_6)$; and $D_{11} = \text{XOR}(D_1, D_6)$.

Figure 5:
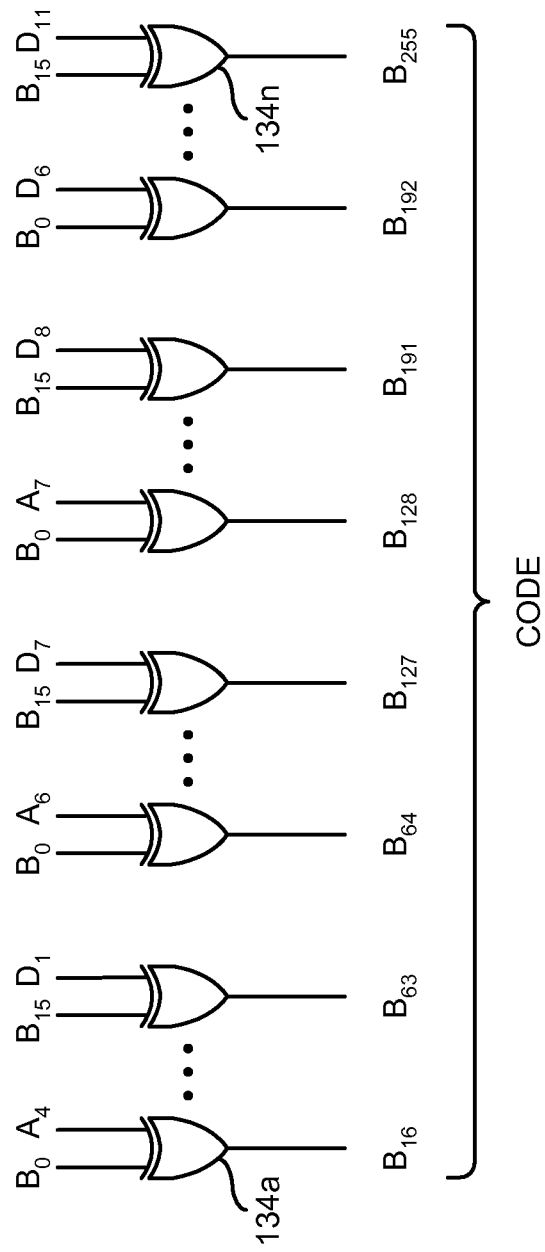
FIG. 5 is a block diagram of an example implementation of still another logic circuit within the OVSF generator circuit.

Referring to FIG. 5, a block diagram of an example implementation of the circuit 114 is shown. The circuit 114 generally comprises multiple gates (or circuits) 134a-134n. The circuits 134a-134n may represent modules and/or blocks that may be implemented as hardware, software, a combination of hardware and software, or other implementations. In some embodiments, the circuits 134a-134n may be implemented only in hardware. Each circuit 134a-134n may implement a two-input XOR gate. The calculations performed by the circuits 134a-134n may be expressed as follows:

$B_{16} \ldots B_{31} = \text{XOR}(B_0 \ldots B_{15}, A_4)$;

$B_{32} \ldots B_{47} = \text{XOR}(B_0 \ldots B_{15}, A_5)$;

$B_{48} \ldots B_{63} = \text{XOR}(B_0 \ldots B_{15}, D_1)$;

$B_{64} \ldots B_{79} = \text{XOR}(B_0 \ldots B_{15}, A_6)$;

$$B_{80} \ldots B_{95} = \text{XOR}(B_0 \ldots B_{15}, D_2);$$

$$B_{96} \ldots B_{111} = \text{XOR}(B_0 \ldots B_{15}, D_4);$$

$$B_{112} \ldots B_{127} = \text{XOR}(B_0 \ldots B_{15}, D_7);$$

$$B_{128} \ldots B_{143} = \text{XOR}(B_0 \ldots B_{15}, A_7);$$

$$B_{144} \ldots B_{159} = \text{XOR}(B_0 \ldots B_{15}, D_3);$$

$$B_{160} \ldots B_{175} = \text{XOR}(B_0 \ldots B_{15}, D_5);$$

$$B_{176} \ldots B_{191} = \text{XOR}(B_0 \ldots B_{15}, D_8);$$

$$B_{192} \ldots B_{207} = \text{XOR}(B_0 \ldots B_{15}, D_6);$$

$$B_{208} \ldots B_{223} = \text{XOR}(B_0 \ldots B_{15}, D_9);$$

$$B_{224} \ldots B_{239} = \text{XOR}(B_0 \ldots B_{15}, D_{10}); \text{ and}$$

$$B_{240} \ldots B_{255} = \text{XOR}(B_0 \ldots B_{15}, D_{11}).$$

In some embodiments, all code bits located, at a power of two index (e.g., $B_1$, $B_2$, $B_4$, $B_8$, $B_{16}$, etc.) may be calculated directly as a NOT (or inversion) operation of the corresponding index value bit, instead of being calculated with a XOR operation. For example, NOT gates may be used in place of the XOR gates because an input to each such calculation is the code bit $B_0$. Since the code bit $B_0$ is fixed to the logical "1" value, the corresponding XOR gates merely invert the bits received on the other inputs.

Replacing the $B_0$-input XOR gates with NOT gates, the circuit 104 may be implemented with 260 XOR gates, 7 NOT gates, 1 level of NOT gates and 3 levels of XOR gates for generating an OVSF sequence of 256 bits. Therefore, the circuit 104 may achieve an approximately 50 percent reduction in timing of a single OVSF sequence generation with less than a 5 percent increase in the number of gates compared with common designs.

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a first circuit configured to generate (i) a plurality of first code bits in response to an index value and (ii) a plurality of first intermediate bits in response to said index value, wherein (a) said first code bits are generated in parallel with said first intermediate bits, (b) said first code bits are generated separately from said first intermediate bits and (c) said first code bits are fewer in number than said first intermediate bits; and
    a second circuit configured to generate a plurality of second code bits in response to all of (i) said index value, (ii) said first code bits and (iii) said first intermediate bits, wherein a combination of said first code bits and said second code bits forms one of a plurality of orthogonal codes.

2. The apparatus according to claim 1, wherein said orthogonal codes comprises orthogonal variable spreading factor codes.

3. The apparatus according to claim 1, wherein a delay from a reception of said index value through said generation of said one orthogonal code is at most three logic gate delays.

4. The apparatus according to claim 1, wherein (a) said second circuit is further configured to generate a plurality of second intermediate bits in response to both (i) said index value and (ii) said first intermediate bits and (b) said second code bits are greater in number than said second intermediate bits.

5. The apparatus according to claim 4, wherein said second intermediate bits are generated in parallel with said second code bits.

6. The apparatus according to claim 4, further comprising a third circuit configured to generate a plurality of third code bits in response to all of (i) said index value, (ii) said first code bits, (iii) said first intermediate bits and (iv) said second intermediate bits, wherein a combination of said first code bits, said second code bits and said third code bits forms another one of said orthogonal codes.

7. The apparatus according to claim 4, wherein a delay from a reception of said index value through said generation of said one orthogonal code is at most four logic gate delays.

8. The apparatus according to claim 6, wherein said first code bits are 4 code bits, said second code bits are 12 code bits and said third code bits are 240 code bits.

9. The apparatus according to claim 1, wherein said first circuit and said second circuit form a portion of a wideband code division multiple access circuit.

10. The apparatus according to claim 1, wherein said apparatus is implemented as one or more integrated circuits.

11. A method for orthogonal code generation, comprising the steps of:
 (A) generating a plurality of first code bits in response to an index value;
 (B) generating a plurality of first intermediate bits in response to said index value, wherein (i) said first code bits are generated in parallel with said first intermediate bits, (ii) said first code bits are generated separately from said first intermediate bits and (iii) said first code bits are fewer in number than said first intermediate bits; and
 (C) generating a plurality of second code bits in response to all of (i) said index value, (ii) said first code bits and (iii) said first intermediate bits, wherein a combination of said first code bits and said second code bits forms one of a plurality of orthogonal codes.

12. The method according to claim 11, wherein said orthogonal codes comprises orthogonal variable spreading factor codes.

13. The method according to claim 11, wherein a delay from a reception of said index value through said generation of said one orthogonal code is at most three logic gate delays.

14. The method according to claim 11, further comprising the step of:
 generating a plurality of second intermediate bits in response to both (i) said index value and (ii) said first intermediate bits, wherein said second code bits are greater in number than said second intermediate bits.

15. The method according to claim 14, wherein said second intermediate bits are generated in parallel with said second code bits.

16. The method according to claim 14, further comprising the step of:
 generating a plurality of third code bits in response to all of (i) said index value, (ii) said first code bits, (iii) said first intermediate bits and (iv) said second intermediate bits, wherein a combination of said first code bits, said second code bits and said third code bits forms another one of said orthogonal codes.

17. The method according to claim 14, wherein a delay from a reception of said index value through said generation of said one orthogonal code is at most four logic gate delays.

18. The method according to claim 16, wherein said first code bits are 4 code bits, said second code bits are 12 code bits and said third code bits are 240 code bits.

19. The method according to claim 11, wherein said one orthogonal code is generated only in hardware.

20. An apparatus comprising:
 means for generating a plurality of first code bits in response to an index value;
 means for generating a plurality of first intermediate bits in response to said index value, wherein (i) said first code bits are generated in parallel with said first intermediate bits, (ii) said first code bits are generated separately from said first intermediate bits and (iii) said first code bits are fewer in number than said first intermediate bits; and
 means for generating a plurality of second code bits in response to all of (i) said index value, (ii) said first code bits and (iii) said first intermediate bits, wherein a combination of said first code bits and said second code bits forms one of a plurality of orthogonal codes.

* * * * *